United States Patent
Honma et al.

(10) Patent No.: US 6,789,840 B2
(45) Date of Patent: Sep. 14, 2004

(54) UPPER CONNECTING STRUCTURE OF CENTER PILLAR FOR AUTOMOBILE

(75) Inventors: Masayuki Honma, Tokyo-To (JP); Yutaka Miyata, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/348,793

(22) Filed: Jan. 22, 2003

(65) Prior Publication Data

US 2003/0141747 A1 Jul. 31, 2003

(30) Foreign Application Priority Data

Jan. 22, 2002 (JP) ........................................ 2002-013288

(51) Int. Cl.[7] .............................................. B60R 27/00
(52) U.S. Cl. ............................ 296/203.03; 296/187.12; 296/193.06
(58) Field of Search ....................... 296/187.03, 187.12, 296/193.06, 203.01, 203.03, 206

(56) References Cited

U.S. PATENT DOCUMENTS

| | | | | |
|---|---|---|---|---|
| 5,171,058 A | * | 12/1992 | Ishikawa | ............... 296/187.12 |
| 6,474,726 B1 | * | 11/2002 | Hanakawa et al. | .... 296/203.03 |
| 6,607,239 B1 | * | 8/2003 | Fuji | ....................... 296/203.03 |
| 2001/0033096 A1 | * | 10/2001 | Hanyu | .................... 296/203.03 |

FOREIGN PATENT DOCUMENTS

| | | | |
|---|---|---|---|
| JP | 10218018 A | * | 8/1998 |
| JP | 11-348821 | | 12/1999 |

* cited by examiner

*Primary Examiner*—Lori L Coletta
(74) *Attorney, Agent, or Firm*—Smith, Gambrell & Russell, LLP (57) ABSTRACT

Disclosed is an upper connecting structure of a side rail and a center pillar. The side rail has a closed cross section constituted by a side rail outer member and a side rail inner member disposed inside of the side rail outer member. A ridge line extending in a lengthwise direction of a vehicle is formed by an upper surface and a side surface of the side rail outer member. Further, a plurality of bead sections are formed over the upper and side surfaces of the side rail outer member across the ridge line. More specifically, a pair of bead sections are formed with a connection portion of the side rail outer member and the center pillar between so as to securely prevent the upper connecting structure from being collapsed.

13 Claims, 6 Drawing Sheets

UPPER CONNECTING STRUCTURE OF CENTER PILLAR FOR AUTOMOBILE

BACKGROUND OF THE INVENTION

1. Field of the Invention

The present invention relates to a body structure for a vehicle and more particularly to a connecting structure of an upper part of a center pillar of the vehicle.

2. Discussion of Related Arts

With respect to a body structure for connecting a center pillar with a side rail of a vehicle, Japanese Patent Application No. Toku-Kai-Hei 11-348821 proposes a connecting structure constituted by a panel side outer integrally formed with a center pillar outer and a side rail outer, a side rail inner, a center pillar inner and a reinforcement.

Figure 7:
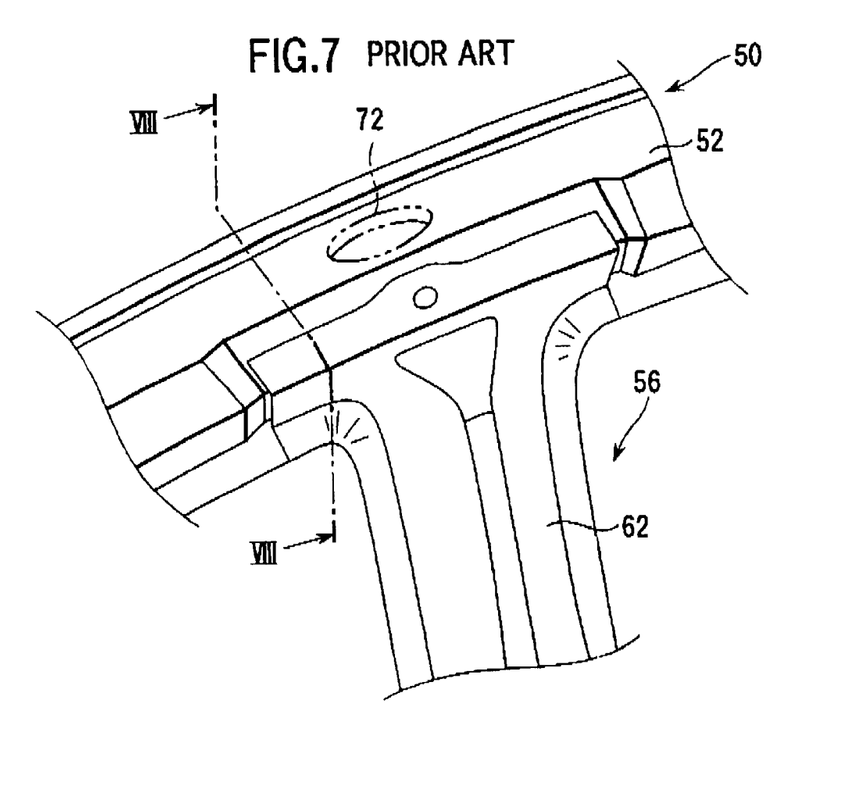
FIG. 7 is a perspective view showing an upper connecting structure of a center pillar for a vehicle according to a prior art.
Figure 8:
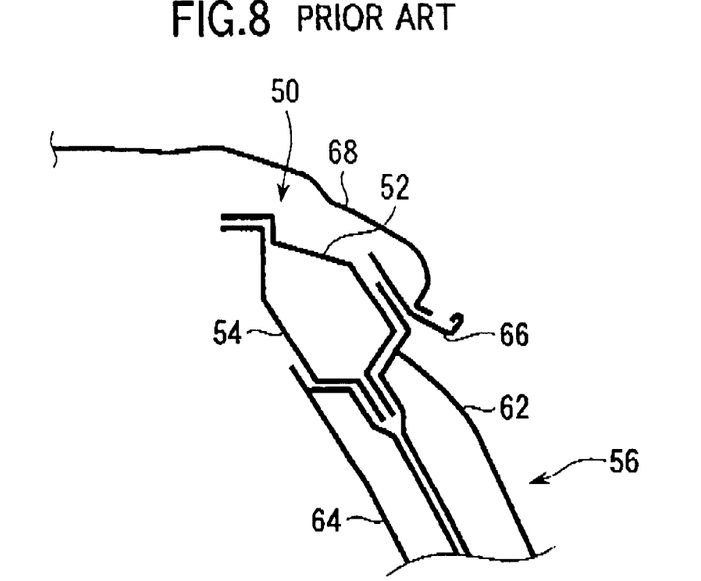
FIG. 8 is a sectional view taken along a line VII—VII of FIG. 7.

Further, with respect to another connecting structure of a center pillar with a side rail, there is a connecting structure shown in a perspective view of FIG. 7 showing an upper connecting portion of a center pillar and in a sectional view of FIG. 8 taken along a line VIII—VIII of FIG. 7. This connecting structure of the center pillar comprises a side rail, a center pillar and a reinforcement disposed in the center pillar. That is, a side rail 50 provided outside of a vehicle body has a closed cross section formed by a side rail outer 52 extending in a longitudinal direction of a vehicle and a side rail inner 54 disposed inside of the side rail outer 52 and extending in a longitudinal direction of the vehicle.

The center pillar 56 is constituted by a center pillar outer member 62 and a center pillar inner member 64. The center pillar outer member 62 is bent outwardly at the upper portion thereof along the outer shape of the side rail outer member 52 and is superposed on the outer surface of the side rail outer member 52. Reference numeral 66 of FIG. 8 denotes a drip rail and reference numeral 68 denotes a roof panel.

Figure 9:
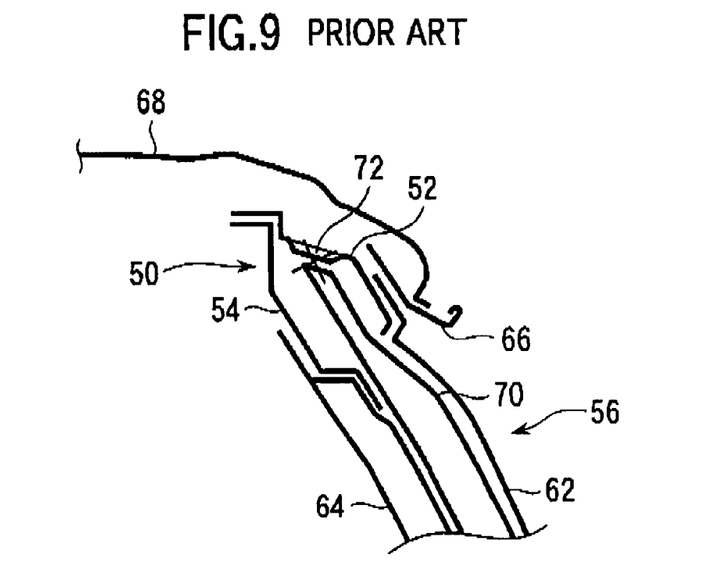
FIG. 9 is a sectional view showing another example of an upper connecting structure of a center pillar for a vehicle according to a prior art.

Further, FIG. 9 shows still another example of the upper connecting structure of a center pillar. There are differences between the upper connecting structure of the center pillar shown in FIG. 7 (or FIG. 8) and that shown in FIG. 9 in providing a center pillar outer reinforcement 70 inside of the center pillar outer 62 and providing a welding surface 72 (shown in a two-dots chain line of FIG. 7) in the side rail outer 52. That is, the top portion of the center pillar outer reinforcement 70 is interposed into the side rail constituted by the side rail outer 52 and the side rail inner 54 and is welded at the upper portion thereof to the back surface of the side rail outer 52.

However, the aforesaid upper connecting structure of the center pillar has a problem that the connecting portion of the center pillar with the side rail is easy to be broken when a big load is exerted from the lateral side of a vehicle in case of a side-on collision and the like. Accordingly, in order to increase the strength of the connecting portion of the center pillar with the side rail, there are countermeasures such as using plate material with large thickness for the constituents of the side rail, center pillar and the like, adding reinforcements thereto et cetera.

However, using steel plates with large thickness for the center pillar, side rail and the like causes bad weldability, weight increase and cost increase. Further, additional reinforcements require an establishment of new welding surfaces and the welding surfaces themselves have a possibility of providing starting points of breakage, depending upon the position and configuration of the reinforcements. Further, in case where high tension steel plates are used for material of the side rail and the like, it is necessary to fix bent edges of the high tension steel plates by beads in order to prevent spring back phenomena after molding. In this case, sometimes the beads themselves become starting points from which breakage of the side rail start.

SUMMARY OF THE INVENTION

It is an object of the present invention to provide an upper connecting structure of a center pillar having a large rigidity and capable of efficiently dispersing a load exerted on the center pillar from the lateral side of a vehicle to a side rail.

In order to attain the object, an upper connecting structure of a center pillar of a vehicle for connecting said center pillar with a side rail comprises a ridge line formed on the side rail outer and extending in a longitudinal direction of the vehicle and a plurality of bead sections formed on the side rail outer and provided across the ridge line in the vicinity of a connecting portion of the side rail outer with the center pillar. The bead sections are formed with the connecting portion of the side rail outer and the center pillar between.

DESCRIPTION OF THE PREFERRED EMBODIMENTS

Figure 1:
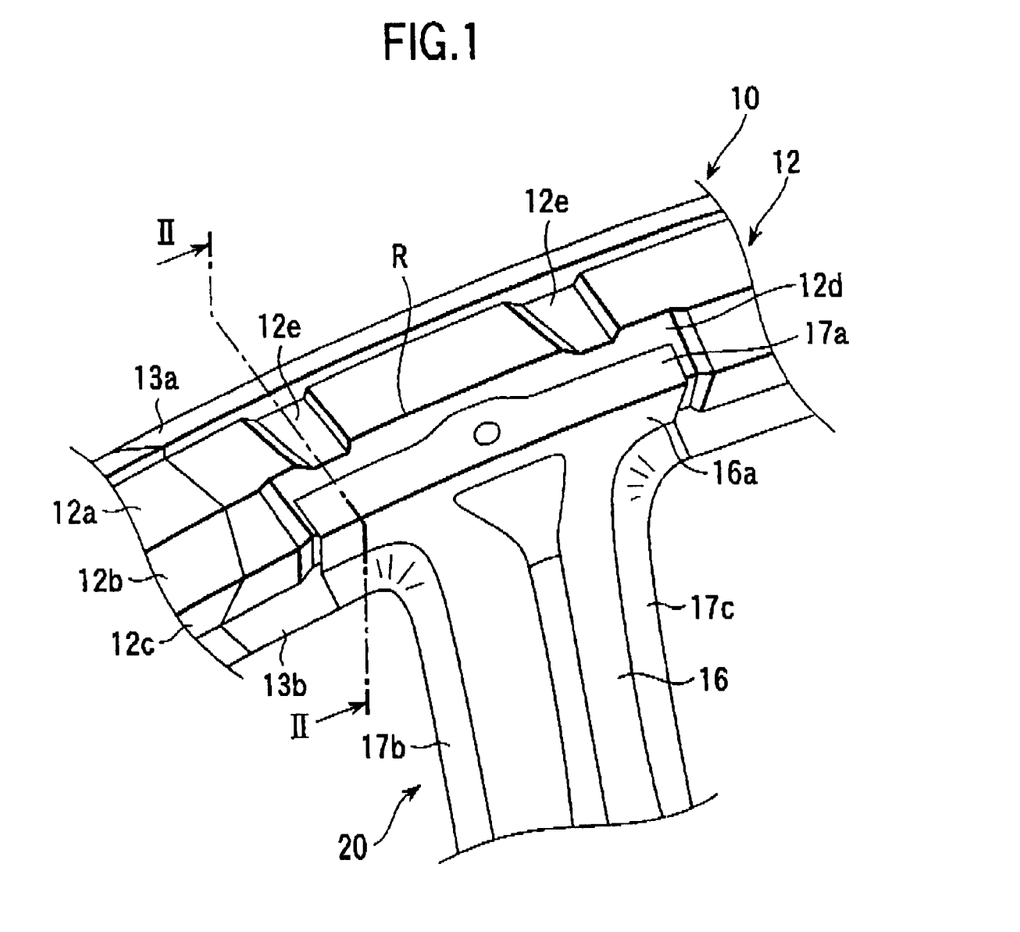
FIG. 1 is a perspective view showing a connecting portion of a center pillar with a side rail for a vehicle according to a first embodiment of the present invention.
Figure 2:
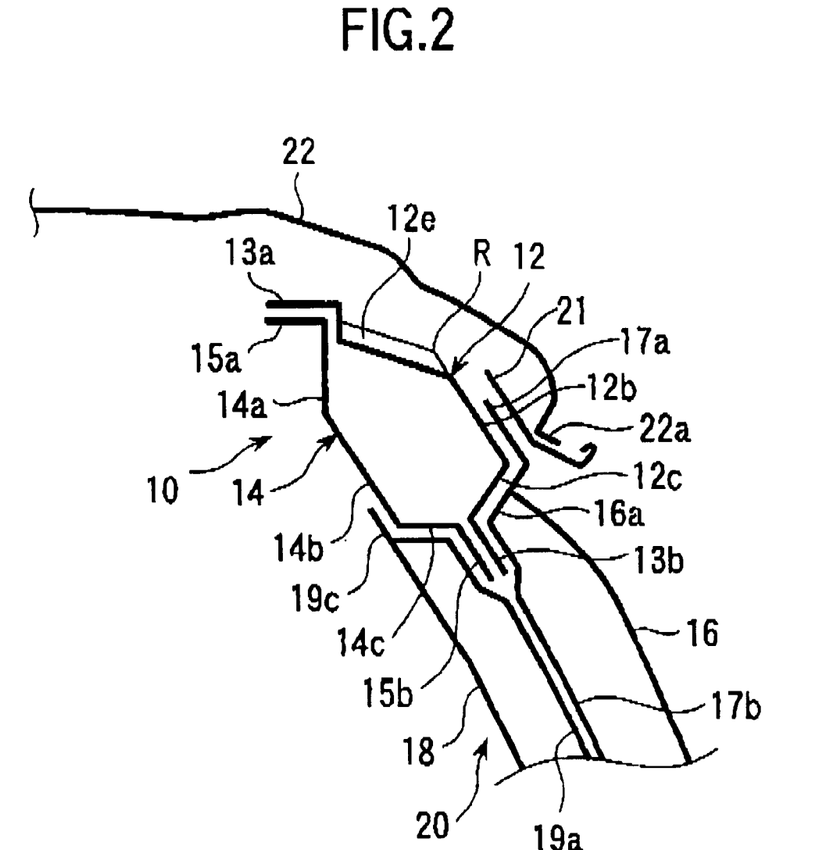
FIG. 2 is a sectional view taken along a line II—II of FIG. 1.

Referring now to FIG. 1 and FIG. 2, reference numeral 10 denotes a side rail disposed at an upper portion of a lateral side of a vehicle body and the side rail 10 is a closed cross section channel constituted by a side rail outer 12 disposed outside of a vehicle body and a side rail inner 14 disposed inside of the vehicle body.

The side rail outer 12 is a member extending in a longitudinal direction of the vehicle and has a C-shaped cross section successively formed by an upper surface 12a, a side surface 12b and a lower surface 12c and an upper flange 13a is formed at the upper edge of the upper surface 12a. On the other hand, a concave section 12d is formed at the lower edge of the lower surface 12c. Further, the upper section of the center pillar outer 16 is superposed on the concave section 12d to the shape the center pillar outer 16.

A ridge line R is formed between the upper surface 12a and the side surface 12b of the side rail outer 12 in a longitudinal direction of the vehicle. Further, a plurality of bead sections 12e are formed across the ridge line R over the upper surface 12a and the side surface 12b in a lateral direction of the vehicle. As understood from FIG. 1, the bead sections 12e are formed in the vicinity of the connecting section of the side rail outer 12 with the center pillar 20. In this embodiment, a pair of bead sections 12e are formed with the connecting section of the side rail outer 12 with the center pillar 20 between.

The side rail inner 14 is a member extending in a longitudinal direction of the vehicle and has a U-shaped or C-shaped cross section successively formed by an upper surface 14a, a side surface 14b and a lower surface 14c and an upper flange 15a is formed at the upper edge of the upper surface 14a in an opposed manner to the upper flange 13a of the side rail outer 12. Further, a lower flange 15b is formed at the lower edge of the lower surface 14c in an opposed manner to the lower flange 13b.

The center pillar outer 16 has a U-shaped or C-shaped cross section and is formed at the upper section thereof into a T-shape in a longitudinal direction of the vehicle. The T-shape section of the center pillar outer 16 has a side rail connecting surface 16a and an upper end flange 17a opposite to the lower surface 12c and the side surface 12b of the side rail outer member 12, respectively. Further, the center pillar outer 16 includes a front flange 17b connected with the lower edge of the side rail connecting surface 16a and a rear flange 17c connected with the lower edge of the side rail connecting surface 16a.

The center pillar inner 18 has a U-shaped cross section and includes a front flange 19a and a rear flange (not shown) opposite to the front flange 17b and the rear flange 17c of the center pillar outer 16, respectively. Further, the center pillar inner 18 has an upper end flange 19c opposite to the side surface 14b of the side rail inner 14 at the upper portion thereof.

Thus formed upper end flange 19c of the center pillar inner 18 is superposed on and welded to the side surface 14b of the side rail inner 14, the side rail inner 14 being integrally connected with the center pillar inner 18.

On the other hand, the center pillar outer 16 is superposed on a lower flange 13b formed at a concave portion 12d of the side rail outer 12 and the connecting surface of the center pillar outer 16 is superposed on the connecting surface of the side rail outer 12. Further, thus superposed side rail outer 12 and center pillar outer 16 are welded to each other and as ; result the side rail outer 12 is integrally connected with the center pillar outer 16.

Further, the upper flange 13a of the side rail outer 12 is superposed on and welded to the upper flange 15a of the side rail inner 14 and the lower flange 13b of the side rail outer 12 is superposed on the lower flange 15b of the side rail inner 14. Further, the lower flange 13b is superposed on and welded to the front flange 17b formed at the lower edge of the side rail connecting surface 16a of the center pillar outer 16 and the lower flange 15b is superposed on and welded to the upper portion of the rear flange 17c. Further, a drip rail 21 is superposed on and welded to the upper flange 17a of the center pillar outer 16 and a side end flange 22a of a roof panel 22 is superposed on and welded to the drip rail 21.

Similarly, the front flange 17b of the center pillar outer 16 is superposed on and welded to the front flange 19a of the center pillar inner 18 and the rear flange 17c of the center pillar outer 16 is superposed on and welded to the rear flange of the center pillar inner 18.

Thus, the side rail 10 having a closed cross section is formed by the side rail outer 12 and the side rail inner 14 and the center pillar 20 having a closed cross section is formed by the center pillar outer 16 and the center pillar inner 18.

According to the first embodiment, in case where a load is applied to the lateral side of the vehicle, the load is transferred to the side rail outer 12, particularly to the plurality of the bead sections 12e formed on the side rail outer 12. Whereby, the load transferred to the side rail outer 12 through the center pillar 20 is dispersed and as a result the connecting portion of the side rail 10 with the center pillar 20 can be prevented from being collapsed. In the first embodiment, since the bead sections 12e are formed in a longitudinal direction of the vehicle with the connecting portion of the side rail 10 and the center pillar 20 between, the load diverges in front and rear directions of the vehicle.

Further, according to the first embodiment, the bead sections 12e keep the configuration of the side rail outer 12. In case where high tension steel plates are used for the side rail outer 12, it is necessary to provide additional beads in the side rail outer 12 in order to retain the configuration of the side rail outer 12. However, since the bead sections 12e for dispersing the load retain the configuration of the side rail outer 12, it is not necessary to provide additional beads in order to retain the configuration of the side rail outer member 12. Accordingly, these additional beads can be prevented from becoming starting points from which breakage of the side rail starts.

Figure 3:
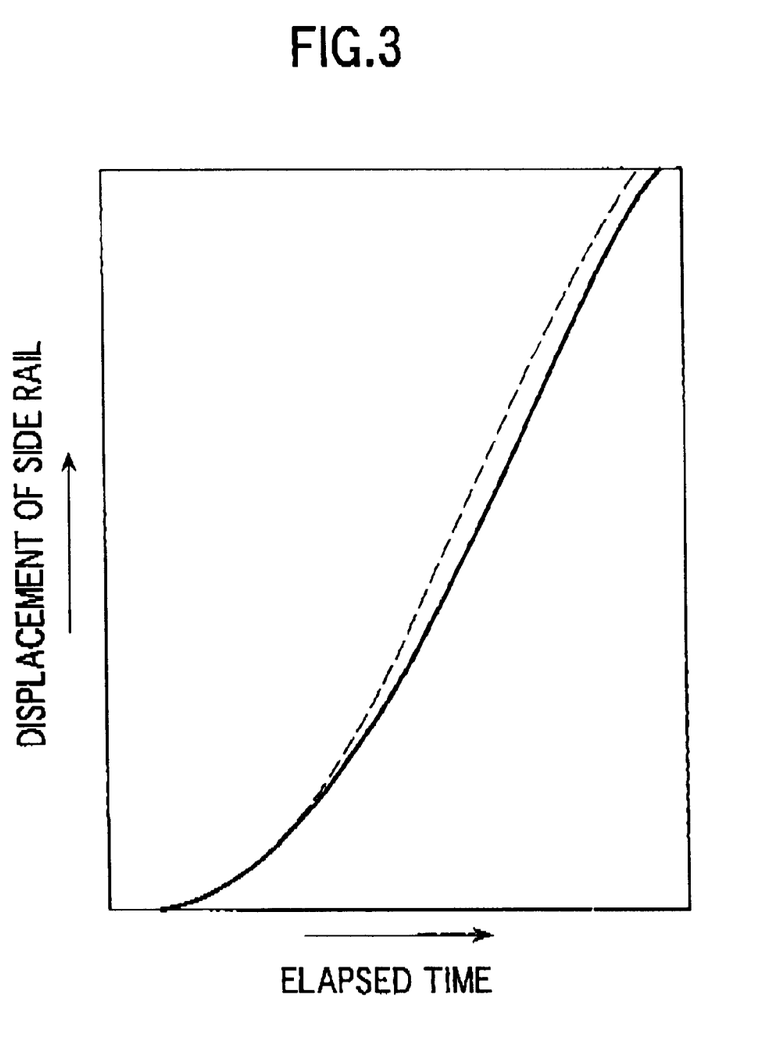
FIG. 3 is a graph showing a time versus displacement of a side rail according to the upper connecting structure of the center pillar of the present invention in an event of a side-on impact.

FIG. 3 is a graph showing the result of a confirmatory testing of the effect of the load dispersion in the upper connecting structure of the center pillar according to the present invention. In the graph, an axis of ordinate is a displacement of a side rail into a vehicle body in the event of a side-on collision and an axis of abscissa is elapsed time. The test result according to the first embodiment of the present invention is charted in a solid line and the test result of an example according to the prior art shown in FIG. 7 is charted in a broken line. As understood from FIG. 3, the displacement of the side rail into the vehicle body is improved by around 10%.

Figure 4:
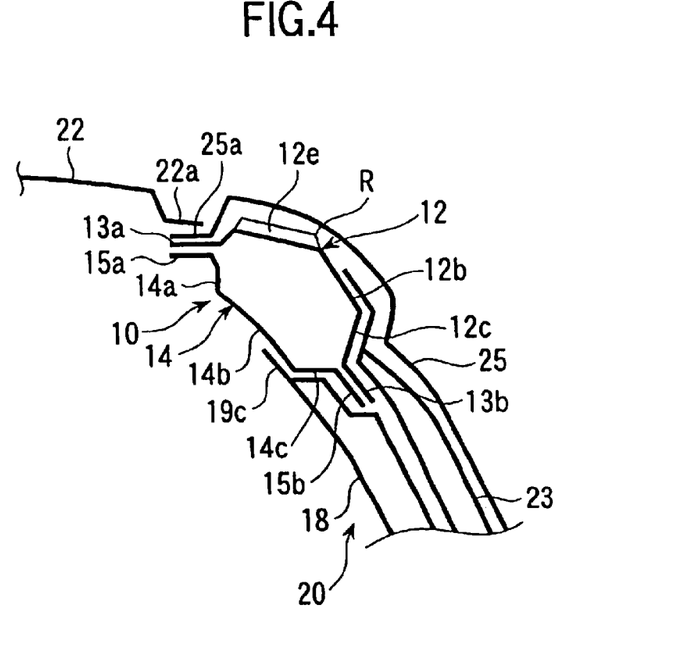
FIG. 4 is a sectional view of a connecting portion of a center pillar with a side rail according to a second embodiment of the present invention.

Next, an upper connecting structure of the center pillar according to a second embodiment of the present invention will be described by reference to FIG. 4.

The second embodiment is different from the first embodiment in having a center pillar outer reinforcement 23 in place of the center pillar outer member 16 and further having an outside panel 25 outside of the center pillar outer reinforcement 23. An upper end flange 25a of the outside panel 25 is welded to the side end flange 22a of the roof panel 22 and to the upper flange 13a of the side rail outer 12 in interleaving relation to both and further the upper flange 13a is welded to the upper flange 15a of the side rail inner 14 from underneath.

In a similar way to the first embodiment, the bead sections 12e act as efficiently dispersing a load transferred to the side rail outer 12 from the center pillar 20, whereby the connecting portion of the side rail 10 with the center pillar 20 can be prevented from being broken due to a load concentration.

Figure 5:
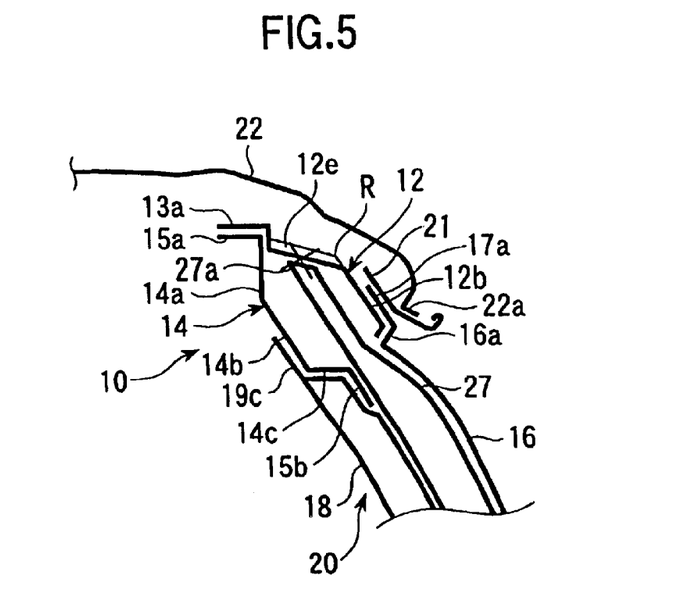
FIG. 5 is a sectional view of a connecting portion of a center pillar with a side rail according to a third embodiment of the present invention.

Next, an upper connecting structure of the center pillar according to a third embodiment of the present invention will be described by reference to FIG. 5.

The upper connecting structure of the center pillar according to the third embodiment differs from that according to the first embodiment in further having a center pillar outer reinforcement 27 rigidly connected with the inner surface of the side rail outer 12. The center pillar outer reinforcement 27 is molded to the inner surface of the center pillar outer 16 and has an upper end flange 27a at the upper portion thereof opposite to the inner surface of the bead sections 12e formed in the side rail outer 12. The upper end flange 27a of the center pillar outer reinforcement 27 is rigidly connected to the bead sections 12e formed in the side rail outer 12. In the drawing, the position of the upper end flange 27a to be welded to the bead sections 12e is marked with "x".

Also in case of the third embodiment, the bead section 12e serves as efficiently dispersing a load transferred to the side rail outer 12 from the center pillar 20, whereby the connecting portion of the side rail 10 with the center pillar 20 can be prevented from being broken due to a load concentration.

Further, in the third embodiment, the bead section 12e serves as a welding surface where the side rail outer 12 is welded to the center pillar outer reinforcement 27. Hence, it is not necessary to provide a special welding surface where the side rail outer 12 is welded to the center pillar outer reinforcement 27.

Figure 6:
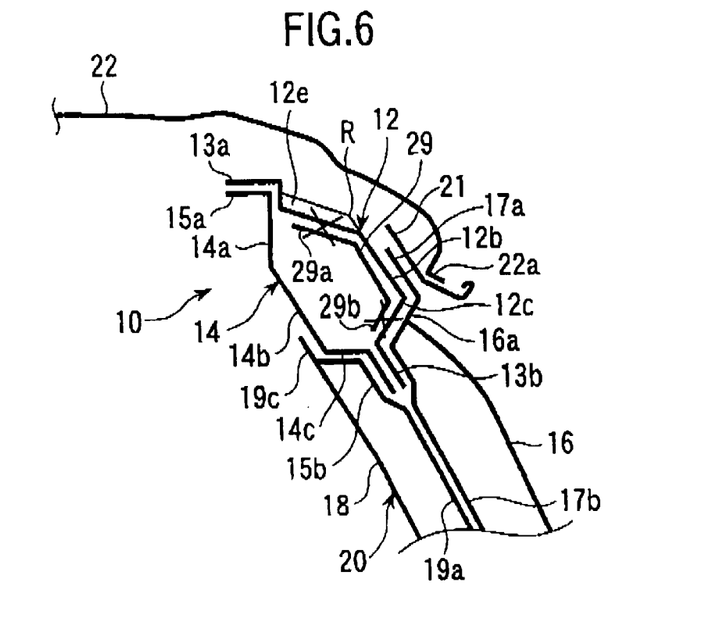
FIG. 6 is a sectional view of a connecting portion of a center pillar with a side rail according to a fourth embodiment of the present invention.

Next, an upper connecting structure of the center pillar according to a fourth embodiment of the present invention will be described by reference to FIG. 6.

The upper connecting structure of the center pillar according to the fourth embodiment differs from that according to the first embodiment in further having a side rail reinforcement 29 connected with the inner surface of the side rail outer 12. The side rail reinforcement 29 is molded to the inner surface of the side rail outer 12 and has an upper end flange 29a being opposite to the inner surface of the bead section 12e formed in the side rail outer 12 in the upper portion thereof and a lower end flange 29b being opposite to the inner surface of the lower surface 12c of the side rail outer 12 in the lower portion thereof. The upper end flange 29a of the side rail reinforcement 29 is superposed on and welded to the bead section 12e formed in the side rail outer 12. Further, the lower end flange 29b of the side rail reinforcement 29 is superposed on from underneath and welded to the lower surface 12c formed in the side rail outer 12. A mark "x" of FIG. 6 indicates a position where the bead section 12e is welded to the upper end flange 29a.

Also in case of the fourth embodiment, the bead section 12e serves as efficiently dispersing a load transferred to the side rail outer 12 from the center pillar 20, whereby the connecting portion of the side rail 10 with the center pillar 20 can be prevented from being broken due to a load concentration.

Further, in the fourth embodiment, the bead section 12e serves as a welding surface where the side rail outer 12 is welded to the side rail reinforcement 29. Hence, it is not necessary to provide a special welding surface where the side rail outer 12 is welded to the side rail reinforcement 29.

The entire contents of Japanese Patent Application No. Tokugan 2002-013288 filed Jan. 22, 2002, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An upper connecting structure between a center pillar extended in a vertical direction of a vehicle and a side rail extended in a longitudinal direction of said vehicle, said side rail having a side rail outer member extended in a longitudinal direction of said vehicle at an outside and upper edge portion thereof, and a side rail inner member extended in parallel with said side rail outer member along an inside surface of said side rail outer member, comprising:
    a ridge formed in an upper surface of said side rail outer member; and
    at least one bead section formed on said side rail outer member near a connection point of said center pillar and said side rail so as to effectively disperse an impact load from a sideward direction of said vehicle to said side rail when a collision occurs.

2. The upper connecting structure according to claim 1, wherein:
    said bead section is provided on both sides of said connection point of said center pillar and said side rail.

3. The upper connecting structure according to claim 1, further comprising:
    a reinforcement provided to connect said inside surface; and,
    a welding seat provided in said bead section for welding said side rail outer member and said reinforcement together.

4. The upper connecting structure according to claim 2, further comprising:
    a reinforcement provided to connect said inside surface; and,
    a welding seat provided in said bead section for welding said side rail outer member and said reinforcement together.

5. The upper connecting structure according to claim 1, wherein:
    said bead section is provided to keep a configuration of said side rail outer member.

6. The upper connection structure according to claim 2, wherein:
    said bead section is provided to help retain configuration of said side rail outer member in event of a sideward collision.

7. The upper connecting structure according to claim 3, wherein:
    said bead section is provided to help retain configuration of said side rail outer member in event of a sideward collision.

8. A structure of a vehicle for connecting a side rail extending in a longitudinal direction of the vehicle along a lateral edge of a roof panel of the vehicle with an upper portion of a center pillar extending in a vertical direction of the vehicle, wherein
    said side rail having a side rail outer member facing outside of the vehicle and a side rail inner member facing inside of the vehicle, said side rail outer member and said side rail inner member forming the side rail as a channel having a closed cross section,
    said side rail outer member comprising:
        a side surface on which an upper portion of a member constituting the center pillar is connected,
        a first upper flange disposed adjacent said roof panel and connected with a second upper flange of said side rail inner member;
        an upper surface facing upward and successively formed between said side surface and said first upper flange;

a ridge line formed by intersection of said side surface and said upper surface, and at least one bead section recessed on the upper surface in a vicinity of a connecting section at which the side rail is connected with the upper portion of the center pillar such that said bead section extends cross the ridge line to the side surface.

9. The structure of a vehicle according to claim 8, wherein two bead sections are disposed such that said connecting section is situated between said two bead sections in a longitudinal direction of the vehicle.

10. The structure of a vehicle according to claim 8, wherein said center pillar includes a center pillar reinforcement which is connected with the side rail and said center pillar reinforcement is connected with the bead section of the side rail outer member at an upper end thereof.

11. The structure of a vehicle according to claim 10, wherein said center pillar reinforcement is welded to a bottom of the bead section.

12. The structure of a vehicle according to claim 8, wherein said side rail includes a side rail reinforcement disposed inside of the side rail outer member and is connected with the side rail outer member, and said side rail reinforcement is connected with the bead section.

13. The structure of a vehicle according to claim 12, wherein said side rail reinforcement is welded to a bottom of the bead section.

* * * * *